United States Patent [19]

Hayn et al.

[11] Patent Number: 4,955,674

[45] Date of Patent: Sep. 11, 1990

[54] ANTI-LOCKING HYDRAULIC BRAKE SYSTEM

[75] Inventors: Holger V. Hayn, Bad Vibel; Juergen Rausch, Eschborn/Ts., both of Fed. Rep. of Germany

[73] Assignee: Alfred Teves GmbH, Frankfurt am Main, Fed. Rep. of Germany

[21] Appl. No.: 406,484

[22] Filed: Sep. 13, 1989

[30] Foreign Application Priority Data

Sep. 24, 1988 [DE] Fed. Rep. of Germany ....... 3832538

[51] Int. Cl.$^{5}$ ................................................ B60T 8/42

[52] U.S. Cl. ...................................... 303/114; 303/92; 303/116

[58] Field of Search ............. 188/187 A; 303/92, 110, 303/113, 114, 115, 116, 119

[56] References Cited

U.S. PATENT DOCUMENTS 4,715,665 12/1987 Ostwald .......................... 303/115 X 4,717,210 1/1988 Belart et al. ........................ 303/114

4,846,533 7/1989 Farr .................................... 303/113

*Primary Examiner*—Duane A. Reger

*Attorney, Agent, or Firm*—Robert P. Seitter

[57] ABSTRACT

A master brake cylinder (2) communicates with wheel brakes through brake conduits (8, 9). Pumps (20, 21) deliver fluid to the brake conduits (8, 9) through pressure conduits (22, 23). Upon commencement of an anti-lock control, the pump drive M is turned on and check valve (26) in the brake conduit is blocked. In conventional systems, the check valve could, during a control operation, open upon an increased pressure fluid requirement of the wheel brakes. Use of a diaphragm in the pressure conduit (22) insures that the dynamic pressure in the chamber (37) will hold the switch piston (28) in all circumstances in a displaced position so that the valve ball (45) blocks the valve passage (46), and the brake conduit (8) is interrupted.

10 Claims, 1 Drawing Sheet

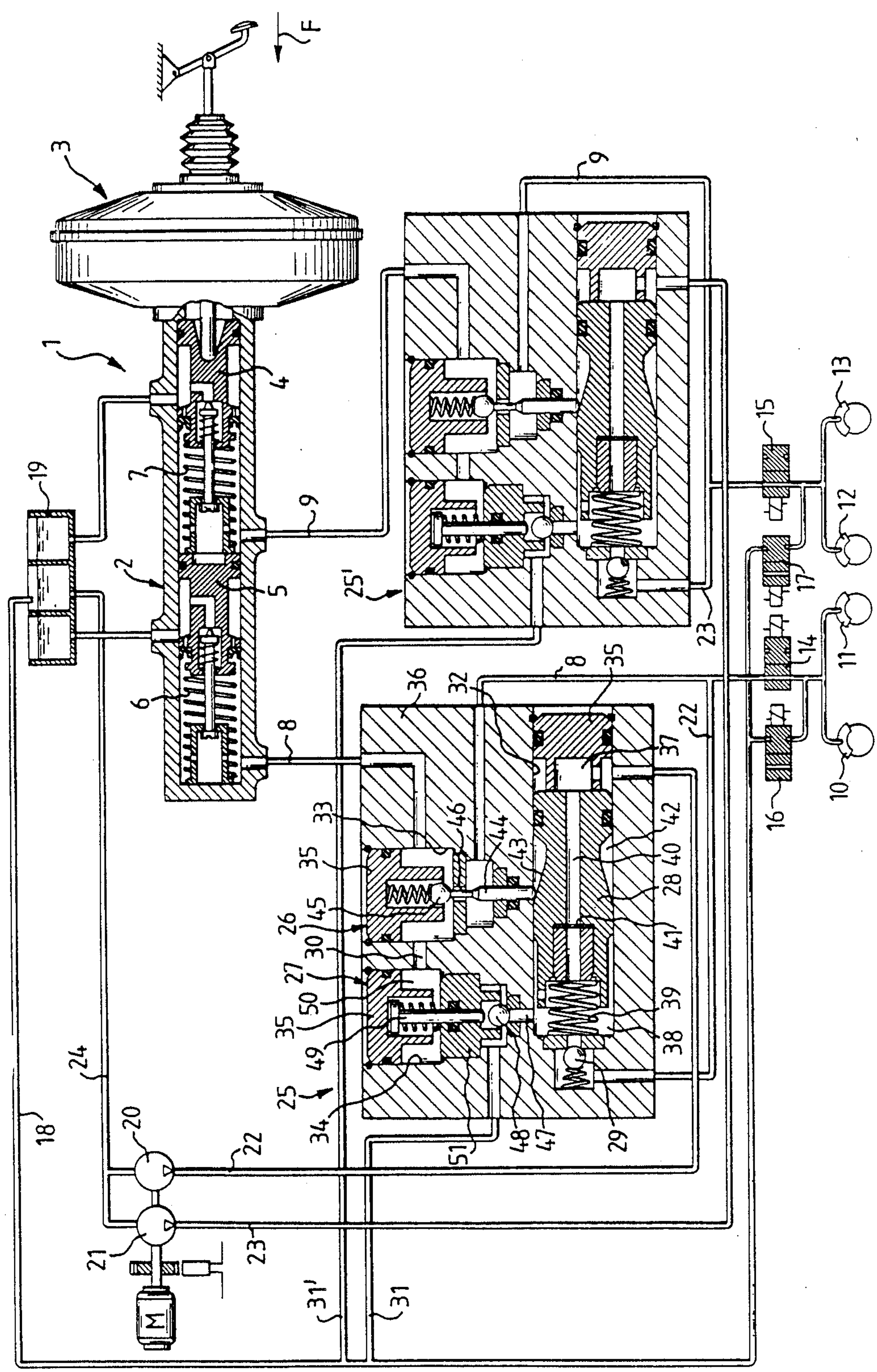

ANTI-LOCKING HYDRAULIC BRAKE SYSTEM

BACKGROUND OF THE INVENTION

The present invention is concerned with an anti-locking hydraulic brake system of the type described in U.S. Pat. No. 4,685,747 issued to Belart et al. on Aug. 11, 1987 (corresponding to German DE-OS No. 35 02 451). To prevent the wheels from locking during deceleration, the anti-lock control will begin to operate in the event of an imminent locking danger. For that purpose, the driver or motor is actuated and the brake conduits are blocked so that the brake pedal will remain in its instantaneous position. The pressure in the master cylinder now serves to excite a control valve adjusting the pressure on the outlet of the pump to a value proportional to the pressure in the master brake cylinder. Through actuation of the inlet and outlet valves, pressure fluid can be supplied to and discharged from the wheel brakes so that the pressure in the wheel brakes is adjusted exactly to a value that avoids wheel locking. According to the Belart et. al. patent, the check valve is hydraulically excited so that the regulated pressure is used as a control pressure for switching the check valve into its blocking position.

While this solution is generally satisfactory it is possible during a controlled deceleration for the pressure on the outlet of the pump to decrease rapidly. This can happen, for example, if the wheels are first decelerated on a road section of a low coefficient of friction and are then decelerated on a road section of a high coefficient of friction. When passing from one road section to another, a relatively large amount of fluid pressure is needed in the wheel brakes to adapt to the new friction conditions. If the pump fails to supply this amount of pressure fluid, the pressure on the pump outlet will drop causing the check valve to switch back to its open position. The required amount of pressure fluid will then be discharged from the master brake cylinder so that the volume thereof is quickly depleted if the described change between friction coefficient surfaces, as described, occurs in a rapid sequence. If, in the above-described circumstances, the pressure fluid supply of the pump fails there will no longer be any reserve volume available in the master brake cylinder that would permit an emergency deceleration.

SUMMARY OF THE INVENTION

The above described problem is solved by this invention which therefore, includes configuring the brake system so that during a controlled braking the check valve safely remains in the switch condition in which the brake conduit is blocked.

The inventive arrangement is particularly simple and includes a diaphragm provided in a longitudinal channel within the piston. The check valve is actuated by means of a plunger displaced by a ramp on the piston. A particularly compact unit is obtained if the locking and control valves as well as the piston are accommodated in a common housing. In this way communication between the pressure conduit and the secondary line can be established through a housing channel.

DESCRIPTION OF THE DRAWING

The invention will be described hereinafter in closer detail with reference to the single figure of accompanying drawing which is a schematic illustration, partly in section, of a preferred embodiment thereof.

DETAILED DESCRIPTION

A brake system according to this invention comprises a brake pressure generator 1 including a tandem master cylinder 2 and a vacuum brake force booster 3 coupled between the tandem master cylinder and a brake pedal. Sealingly guided in the longitudinal bore of the tandem master cylinder 2 are two pistons, viz., push rod piston 4 and floating piston 5 to thereby form two working chambers 6 and 7. By actuating the brake pedal by a force F, the pistons 4 and 5 are displaced to reduce the volume of the working chambers 6 and 7 developing pressure therein. This pressure, through brake conduits 8, 9, is transmitted to the wheel brakes 10, 11, 12, 13 of an automotive vehicle. These wheel brakes are arranged in pairs relative to one another, for example, the wheel brakes of wheels diagonally opposite one another. However, any desired pairing or association may be provided.

Inserted in each of the brake conduits 8 and 9 is an inlet valve 14 and 15, respectively. Each valve 14 and 15 is in the form of a 2-way/2-position valve which is electromagnetically actuated from an electronic control module and is in its normal position, open to permit flow through the brake conduits.

In addition, the wheel brakes 10, 11, 12 and 13 communicate through a return conduit 18 with a reservoir 19. Provided in the return conduit 18 are outlet valves 16 and 17 for controlling flow from the pairs of wheel brakes to the reservoir 19. Each of these valves 16 and 17 is in the form of a 2-way/2-position valve electromagnetically actuated from the control module, and is, in its normal position, closed to block flow through the return conduit 18.

The brake system also includes two pumps 20, 21 actuated by a common electromotor M. The suction sides of pumps 20 and 21 are connected to the reservoir 19 through an intake line 24 and deliver pressure fluid into the discharge lines 22 and 23 respectively. The discharge line 22 communicates with the brake conduit B and the discharge line 23 communicates with the brake conduit 9.

For each brake circuit a combination valve 25,25' is provided. The two combination valves are of identical design and thus one valve, 25', is shown without reference numerals. A description of the combination valves is provided with reference to the combination valve 25. The combination valve 25 includes a check valve 26 inserted in the brake conduit 8 between the working chamber 6 and the point where the discharge line 22 terminates with the brake conduit 8. It is hydraulically excited as described hereinafter in greater detail. Also provided is a check valve 27 inserted in a secondary line 31 between the discharge line 22 and the reservoir 19. A control line 30 connects a control chamber 50 forming part of the check valve 27 to the section of the brake conduit 8 between the master brake cylinder 2 and the check valve 26. A secondary line 31', similar to line 31, is associated with the combination valve 25'.

The combination valve 25, also includes a switch piston 28 and a check valve 29. The housing 36 of the combination valve 25 includes three bores 32, 33, 34 terminating in the outer faces of the housing 36. Each bore is sealed by a closure member 35. Sealingly guided in first port 32 is the afore-mentioned switch piston 28.

Provided on one side of the piston 28 is a chamber 37 and on the other side is a chamber 38. These chambers are interconnected through a longitudinal bore 40 formed in the piston 28 and this bore has a diaphragm 41 inserted therein. The chamber 37 is in direct communication with the outlet of the pump 20 (via discharge line 22) while the chamber 38 is in communication with the brake conduit 8 through another section of the discharge line 22 into which is inserted the check valve 29. The check valve 29 only permits pressure fluid flow from chamber 38 to brake conduit 8 via this another section of the discharge line 22. Moreover, from chamber 38, a channel or port 47 branches off to form a section of the secondary line 31. Provided in chamber 38 is a spring 39 holding the switch piston 28 in abutment with the closure member 35. The central area of the switch piston 28 is formed at its outer periphery with a recess 42 to form an axially extending ramp 43.

Sealingly guided through a section of bore 33 is a plunger 44 one end of which is in abutment with ramp 43. The plunger 44 extends through the valve passage 46 and its other end is in abutment with ball valve 45. In the normal position of the piston 28, as shown, the plunger 44 is at the upper end (or large diameter) of the ramp 44 to lift the ball 45 from its associated sealing seat. The passageway 46 is thus open so as to enable pressure fluid to flow through the brake conduit 8.

Inserted in the lower section (as seen in the drawing) of the third bore 34 is a connector 51. A control chamber 50 is formed above the connecting piece 51. Through the housing channel 30, the control chamber 50 is in communication with the brake conduit 8. A chamber below the connector 51 is, on the one hand, in communication with the reservoir 19 through the secondary line 31 and, on the other hand, is in communication with the chamber 38 through a channel 47. A pin 49 is sealingly guided through the connector 51 and may be brought into abutment with a ball valve 48 seated on a valve seat on the outlet of the channel 47. In the normal position as shown, the pin 49 does not transmit any forces to the ball valve 48 and permits an unhampered flow of pressure fluid from chamber 38 to the secondary line 31. Once a pressure has built up in the master cylinder working chamber 6, the same pressure is exerted on pin 49 to force the ball 48 onto its valve seat. No pressure fluid flow from chamber 38 into the secondary line 31 will be permitted unless the pressure in the chamber 38 is able to overcome the counter-pressure in the control chamber 50.

The operation of the system is described hereinafter.

As previously explained, a pressure can be built up in the master brake cylinder and in the chambers 6 and 7 by actuating the pedal. The valve passage 46 of the check valve 26 is open as the piston 28 is held by spring 39 in its normal position. The 2-way/2-position valves 14 and 15, are in the open position so that the pressure in the working chambers 6 and 7, is transmitted to the wheel brakes 10, 11, 12, 13. During a decelerating (braking ) operation, the rotational pattern of the wheels is constantly monitored to thereby enable an imminent locking danger to be immediately detected. The electronic unit (not shown) will now initiate the following steps.

First, the inlet valves 14 and/or 15 are closed and the outlet valves 16 and/or 17 are opened depending on which wheels are tending to lock. The pressure in the wheel brakes decreases so that the wheels tending to lock are able to adequately re-accelerate. At the same time, the electromotor M is put into operation to cause pumps 20, 21 to first deliver fluid from the reservoir 19 into the chamber 37. Because of the diaphragm 41, the pressure in chamber 37 develops so that the piston 28 is displaced to the left, as shown in the drawing, whereby the ramp 43 causes the plunger 44, to drop downwardly. The ball valve 45 now seats on the valve passage 46 and interrupts flow through the brake conduit 8. Pressure fluid from the chamber 37 now continues to flow through the diaphragm 41 into the chamber 38 and then flows through the check valve 29 into the brake conduit 8. The pressure in the chamber 38 is now adjusted in accordance with the pressure in the control chamber 50. Consequently, pressure fluid will permanently flow into the brake conduits B and 9. By switching the valves 14, 16 and 15, 17, respectively, the pressure in the wheel brakes can be adjusted so that the wheels do not tend to lock.

Because of the diaphragm 41, there is a pressure difference between the chambers 37 and 38 as long as the pumps are delivering fluid. The piston 28 will, therefore, be in a position to the left of the normal position so that valve 26 is always closed. This, in particular, applies to cases where the pressure in chamber 38 temporarily collapses due to an increased pressure fluid requirement from the wheel brakes. As long as the pumps are delivering, the check valve 26 is closed.

Owing to the integrated arrangement in one housing and to the arrangement of the bores, a compact construction is realized so that the combination valve 25 can be readily accommodated in the engine space. Thanks to the fact that the bores 34, 33 extend in a direction vertical to the bore 35 it is easy to establish the required pressure fluid channels.

Upon completion of the control operation, i.e. upon termination of the pressure fluid delivery through the pumps 20, 21, the switch piston 28 returns to its basic position and the pressure in the working chambers 6, 7, is passed unimpededly through the conduits 8 and 9 which are now reopened on to the wheel brakes.

What is claimed is:

1. An anti-locking hydraulic brake system comprising a master brake cylinder and an associated pressure fluid reservoir, wheel brakes and brake conduits connecting the wheel brakes with the master brake cylinder, a return conduit connecting the wheel brakes with the reservoir, inlet valves inserted into the brake conduits and outlet valves inserted into the return conduit, sensors for detecting the rotational pattern of the wheels and an electronic control unit for evaluating the wheel sensor signals and generating control signals for operating the inlet and outlet valves, at least one pump delivering fluid from the reservoir through pressure conduits into the brake conduits, a check valve arranged so as to be under the control of the pump pressure for interrupting the brake conduit, a control valve for adjusting the pressure in the pressure conduits so that it is proportional to the pressure in the master cylinder, a diaphragm inserted into the pressure conduit and a piston located in the pressure conduit with a chamber on opposite sides of the piston, the piston cooperating with a closure member associated with the check valve such that the brake conduit is interrupted upon a movement of the piston under the action of the dynamic pressure upstream of the diaphragm.

2. A brake system according to claim 1 wherein the diaphragm is disposed in a longitudinal bore extending through the piston.

3. A brake system according to claim 1 wherein the outer surface of the piston is formed with a recess in the shape of a ramp, a plunger actuated by the ramp and being in abutment with the valve member of the check valve.

4. A brake system according to claim 1 wherein the check valve, the control valve and the piston are all accommodated in a common housing.

5. A brake system according to claim 4 wherein a housing channel leading to the control valve extends from the chamber.

6. A brake system according to claim 5 wherein the housing channel is sealable by means of a closure member of the control valve.

7. An anti-locking hydraulic brake system comprising a master brake cylinder and an associated pressure fluid reservoir, at least one brake line for connecting the master brake cylinder with wheel brakes, at least one return conduit for connecting the reservoir with wheel brakes, at least one pressure conduit between the reservoir and the brake line, and a combination valve associated with the brake line and the pressure conduit, the combination valve including a check valve in the brake line for interrupting flow therein, a control valve for adjusting the pressure in the pressure line so that it is proportional to the pressure in the master cylinder, and a switch piston in the pressure line having a longitudinal channel therein communicating with chambers on opposite sides of the switch piston, a diaphragm in the longitudinal channel for providing a pressure differential between said chambers, said switch piston cooperating with a closure member associated with the check valve so that the check valve is closed under the influence of dynamic pressure upstream of the switch piston.

8. An anti-locking hydraulic brake system in accordance with claim 7 wherein the switch piston is formed with a ramp and wherein the check valve is operated by a plunger, the plunger being operatively associated with the ramp.

9. An anti-locking hydraulic brake system in accordance with claim 7 wherein the check valve, control valve and switch piston are accommodated in a common housing.

10. An anti-locking hydraulic brake system in accordance with claim further including inlet valve means in the brake lines for controlling the flow of pressure fluid to wheel brakes, outlet valve means in the return conduit for controlling the flow of pressure fluid to the reservoir and pump means in the pressure conduit for delivering pressure fluid from the reservoir to the brake lines.

* * * * *